July 5, 1932. W. STUEBING, JR 1,865,712
LIFTING TRUCK
Original Filed Feb. 24, 1927   3 Sheets-Sheet 3
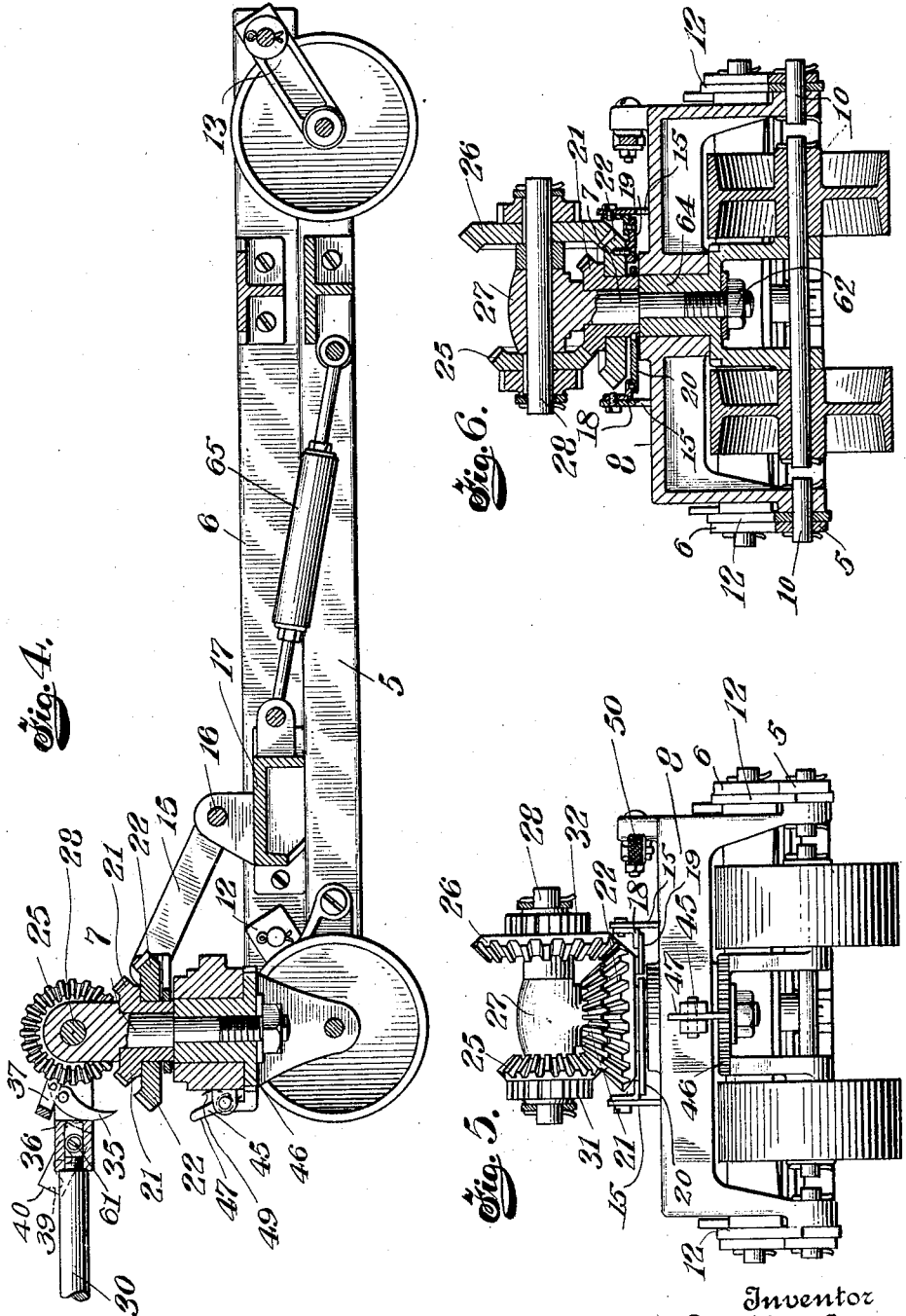
Inventor
William Stuebing Jr.
By his Attorneys
Emery Booth Janney & Varney Patented July 5, 1932

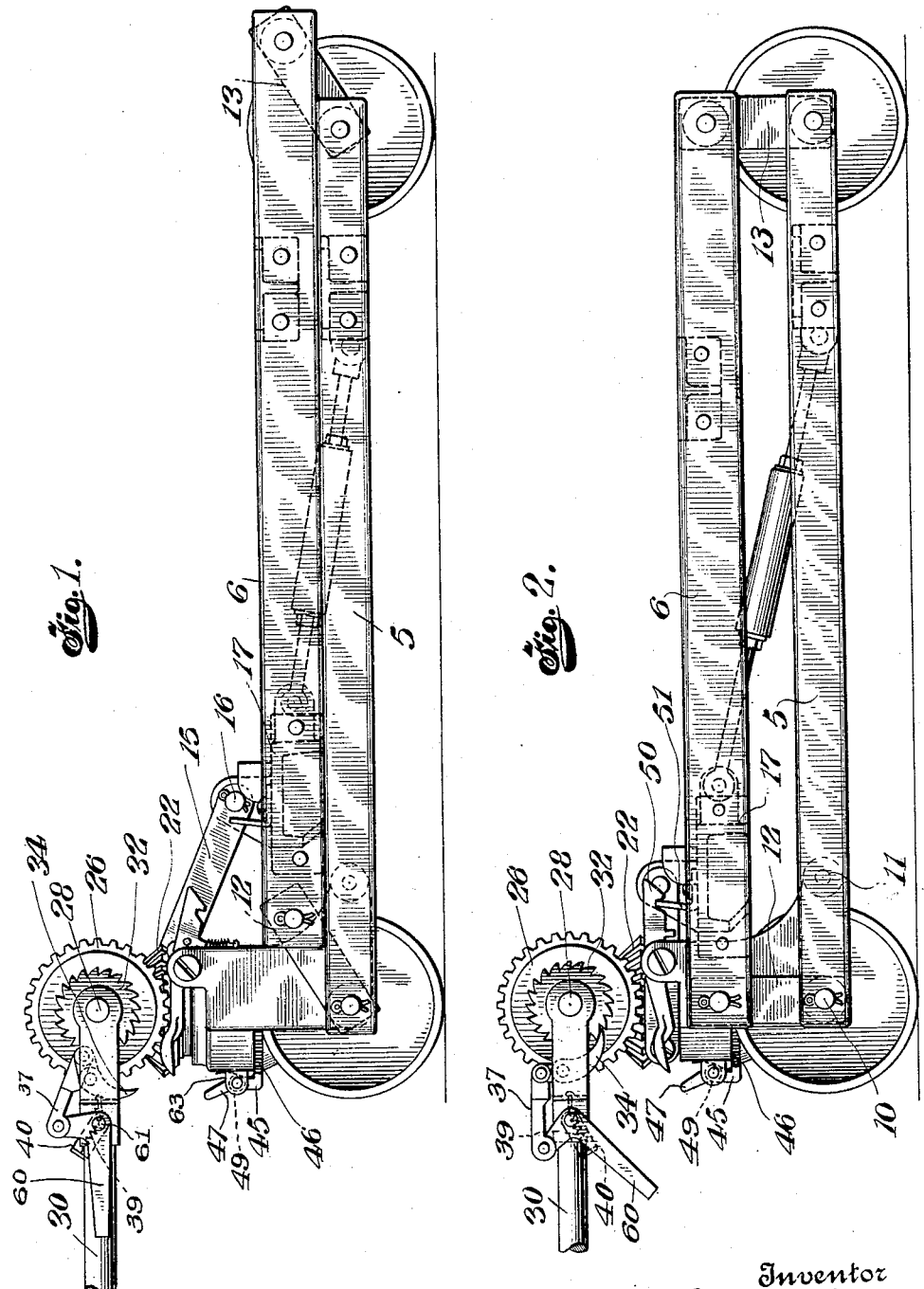

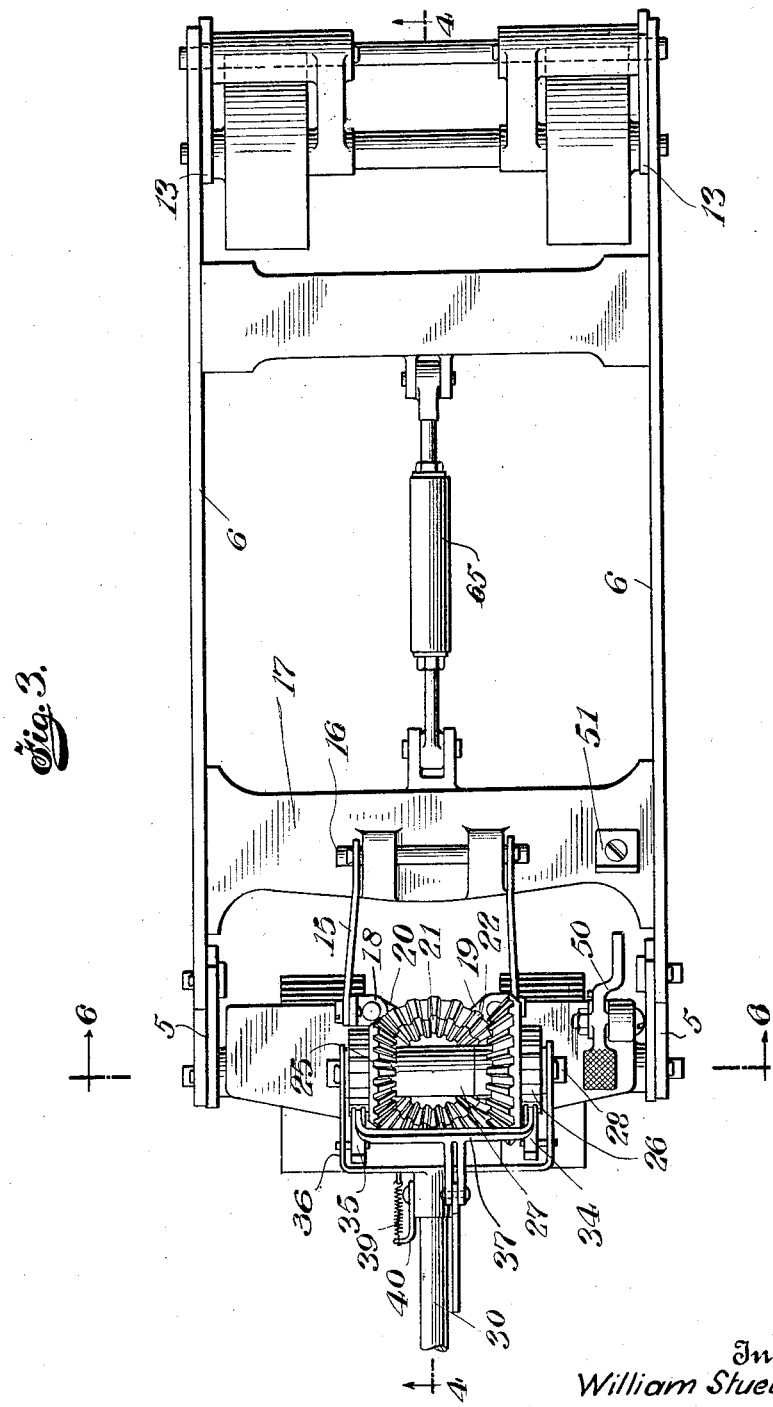

1,865,712

UNITED STATES PATENT OFFICE

WILLIAM STUEBING, JR., OF CINCINNATI, OHIO, ASSIGNOR TO THE YALE & TOWNE MANUFACTURING COMPANY, OF STAMFORD, CONNECTICUT, A CORPORATION OF CONNECTICUT

LIFTING TRUCK

Application filed February 24, 1927, Serial No. 170,443. Renewed April 11, 1931.

The present invention relates to lifting trucks of the type in which the steering and draft handle is operative to cause the lifting of the load.

The invention has been developed in connection with the production of a truck of the so-called side lift type, that is to say, a truck in which the load can be lifted when the steering head is turned at more or less of an angle to the main frame of the truck as in a narrow aisle or other confined space. For convenience a side lift truck embodying the invention will be described for the purposes of illustrating the inventive principles but the particular description is illustrative merely and is not intended as defining the limits of the invention.

Referring to the accompanying drawings forming a part hereof,—

Figure 1 is a view in side elevation of a lifting truck embodying the invention showing the elevating frame in its lowermost position and the lifting mechanism disconnected.

Figure 2 is a similar view of the same but showing the elevating frame in its uppermost position and the lifting means in connected operative relation.

Figure 3 is a plan view of the truck.

Figure 4 is a central sectional view of the truck taken on the line 4—4 of Figure 3.

Figure 5 is a front elevational view partly in section.

Figure 6 is a sectional view through the steering head taken on the line 6—6 of Figure 3.

The truck shown for the purpose of illustrating the invention has a main frame comprising side bars 5 and a load supporting elevating frame comprising side bars 6. A steering head 64 on which is mounted a steering head post 7 is rotatably mounted in a transverse yoke 8 forming part of the main frame to which yoke the side bars 5 of the main frame are rigidly connected as by bolts 10 and 11, see Figures 2 and 6. A suitable check device 65 is connected between the main and elevating frames in the manner usual with trucks of the type forming the subject matter of the present application.

The elevating frame is supported on the main frame by means of front and rear links 12 and 13 respectively and is arranged to be elevated to lift a load by being drawn forward and upward by means of suitable mechanism including links 15 which are connected at their rear lower ends by a pivot bolt 16 to brackets extending upwardly from a cross bar 17 of the elevating frame. The links 15 are connected to and operated by radially disposed power levers or arms 19 and 20 which are arranged to move in an arc about the vertical axis of the steering head to lift the load. The connection between each link 15 and its corresponding arm 19 or 20 includes a bracket in the shape of an angle member 18 pivoted both to the link and to the arm thus forming in effect a universal joint.

The arms 19 and 20 are arranged to be moved simultaneously in opposite directions about the axis of the steering head, preferably by means so connected with the steering handle that the latter may be operated in a vertical plane at any steering position to actuate said arms and to thereby lift the elevating frame. In the arrangement shown, the arms 19 and 20 are fixed to and in effect operate as portions or extensions of horizontal bevel gears 21 and 22 respectively mounted to rotate about the axis of the steering head. These gears are actuated by vertically disposed bevel gears 25 and 26 respectively rotatably mounted or supported on a shaft 28 in a bearing 27 forming part of the steering head post 7, Figure 6. Said shaft provides in addition a pivotal connection between the steering head post 7 and the yoke 36 of steering handle 30. Rigidly secured to the vertical gears 25 and 26 respectively are ratchet wheels 31 and 32 positioned to be actuated by the steering handle 30, through suitable pawls 34, 35 pivoted to the face of yoke 36 and preferably arranged to be drawn simultaneously into or out of operative position by suitable means including a single pawl positioning member 37, Figures 1, 2 and 3.

The forward end of member 37 is pivotally connected to an arm of bell crank lever 60 which is fixed to one end of a bolt 61 extending through and rotatable in the base of yoke 36 and having fixed to its other end an arm 40. A spring 39 connects the free end of said arm with the yoke 36 and serves to retain bell crank lever 60 in the extreme positions shown in Figures 1 and 2, thus retaining member 37 in its inoperative and operative positions respectively.

To lift the elevating frame, the operator throws pawls 34 into engagement with ratchets 31 and 32 by depressing the free end of bell crank lever 60 to the position shown in Figure 2. In the embodiment shown, downward movement of the handle 30 rotates the ratchets 31 and 32 together with their respective gears 25 and 26. As shown in Figure 6, gear 25 actuates gear 21 while gear 26 actuates gear 22, the latter being provided with a central opening through which a collar-like extension of gear 21 projects downwardly and with its bottom edge bearing upon the top edge of the steering head in relation to which it moves freely. The arm 20 with its inner end fixed to said collar-like extension projects radially therefrom and, when said gear 21 is caused to rotate, as above described, the outer end of said arm moves in an arc thereby advancing the forward end of its corresponding link 15. The arm 19 has its inner end secured to the under side of gear 22 and operates in a similar manner to arm 20 but in the opposite direction.

Referring again to Figure 6, it is noted that the lower end of steering head post 7 extends downwardly through steering head 64 and is engaged by a nut 62 which secures said post in fixed relation to the head 64.

Although I have shown and hereinabove described a so-called duplex lifting mechanism, it is possible to secure similar lifting effect by the use of a single power lever or arm, as 20 for example, and its corresponding gear and pawl connections with handle 30. Obviously, with a load on the elevating platform such an arrangement would transmit a torque to the post 7, thus tending to cause lateral deflection of handle 30. In the duplex arrangement, the torque in one direction neutralizes that in the opposite direction so that the handle is in effect locked against lateral turning during lifting operation of the gears 25 and 26 and their associated parts.

To overcome the effect of torque in operation of the single lifting train, whether the truck be built with only one set of lifting mechanism or with duplex mechanism of which one set becomes temporarily inoperative, I provide suitable means for releasably locking the steering head against rotation. For this purpose, a peripheral portion 46 of the steering head 64 is provided with notches to form spaced detents projecting radially from said portion 46 and across the path of a latch 45 pivotally mounted in a bracket 63 secured to the front face of yoke 8. A spring 49 engages the latch in such a manner as to tend to hold the same out of operative engagement with the detents on head 64. However, by deflecting a pedal extension 47 of said latch 45 the latter is moved to operative position against the action of said spring and is retained in operative position by pressure of the lifting head detents which bear against lateral portions of the latch. It will be apparent that a slight lateral movement of the steering handle will release this pressure and thus free the latch which then returns to its inoperative position.

A suitable pedal operated lock 50 is arranged to engage a corresponding hook 51 on the elevating frame to hold the latter in elevated position after the lifting operation.

Various modifications may be made in the structure shown and other embodiments of the invention may be developed without departing from the spirit of the invention as defined in the appended claims.

I claim:

1. A side lift truck comprising in combination a main frame, an elevating frame, a steering head swivelled in the main frame, a steering lever pivoted in the steering head for movement in a vertical plane and means arranged to be actuated by the steering lever in various steering positions for lifting the elevating frame comprising a pair of members movable in arcs in opposite directions about the axis of the steering head.

2. A side lift truck comprising in combination a main frame, an elevating frame, a steering head swivelled in the main frame, a steering lever pivoted in the steering head for movement in a vertical plane and means arranged to be actuated by the steering lever in various steering positions for lifting the elevating frame comprising a pair of gears rotatable in opposite directions on the axis of the steering head and lifting connections between said gears and the elevating frame.

3. A side lift truck comprising, in combination, a main frame, an elevating frame, a steering head swivelled in the main frame, a steering lever pivotally mounted on the steering head for movement in a vertical plane, two pairs of intermeshing bevelled gears, means to operatively connect one gear of each pair to the steering lever to be operated thereby, and means to connect the other gear of each pair to the elevating frame to lift the same.

4. A side lift truck comprising in combination a main frame, an elevating frame, a steering head swivelled in the main frame, a steering lever pivoted in the steering head for movement in a vertical plane, two bevel gears rotatable about the axis of the steering head, a post mounted on the steering head, two bevel gears supported on said post and each meshing with one of the first mentioned bevel gears, connections between said first mentioned gears and the elevating frame to lift the latter and connections between the second mentioned bevel gears and the steering lever whereby the steering lever may actuate the bevel gears to lift the elevating frame.

5. A side lift truck comprising in combination a main frame, an elevating frame, a steering head swivelled in the main frame and having a post, a steering lever pivoted in the steering head for movement in a vertical plane and means arranged to be actuated by the steering lever for lifting the elevating frame comprising two horizontal bevel gears rotatable about the axis of the steering head, two vertical bevel gears supported on the post and each engaging one of the horizontal bevel gears and pawl and ratchet connections between the steering lever and the vertical bevel gears for actuating the latter.

6. A side lift truck comprising in combination a main frame, an elevating frame, a steering lever, means operated by the steering lever for lifting the elevating frame, comprising a member rotatable in a horizontal plane, and connections including a universal joint between said rotatable member and said elevating frame.

7. A lift truck comprising in combination a main frame, an elevating frame, means for lifting said elevating frame including a handle lever pivotally mounted on said main frame, a power lever pivotally mounted on said main frame for arcuate movement in a plane normal to the plane of lifting movement of the handle lever, means operatively interposed between said handle lever and said power lever to actuate the latter when the handle lever is deflected, and a link operatively positioned for lifting connection between said power lever and the elevating frame.

8. A lift truck comprising in combination a main frame, an elevating frame, means for lifting said elevating frame including a handle lever pivotally mounted on said main frame, a power lever pivotally mounted on said main frame for arcuate movement in a plane normal to the plane of lifting movement of the handle lever, means operatively interposed between said handle lever and said power lever to actuate the latter when the handle lever is deflected, a link operatively positioned for lifting connection between said power lever and the elevating frame, and means cooperating with said interposed power lever actuating means to lock the handle lever against lateral turning movement.

9. A lift truck comprising in combination supporting wheels, an elevating frame, means for lifting said elevating frame including a handle lever pivotally related to said wheels, a power means pivotally mounted relatively to said wheels for arcuate movement in a plane different from the plane of lifting movement of the handle lever, means operatively interposed between said handle lever and said power means to actuate the latter when the handle lever is deflected, and means operatively positioned for lifting connection between said power lever and the elevating frame.

10. A side lift truck comprising in combination a main frame, an elevating frame, a steering head swivelled in the main frame, a steering lever pivoted in the steering head, lifting means operatively positioned between the lever and the elevating frame and comprising a member movable in an arc about the axis of the steering head, and means cooperating with said member and with the lever to prevent lateral deflection of the lever during lifting operation thereof due to a load on the lifting frame.

11. A side lift truck comprising in combination a main frame, an elevating frame, a steering head, a steering lever pivotally mounted thereon, and means providing lifting connection between the elevating frame and the lever in all operative steering positions of said lever, said means being arranged in compensating relation to prevent lateral displacement of the lever during load raising operation thereof due to a load on the elevating frame.

12. A side lift truck comprising in combination a main frame, an elevating frame, a steering head, a steering lever pivotally mounted thereon, means including individually movable lifting instrumentalities for connecting the elevating frame and the lever and arranged and adapted to exert substantial compensating torques on said lever to prevent lateral displacement thereof during load raising operation due to a load on the elevating frame.

13. A side lift truck comprising in combination a main frame, an elevating frame, a steering head, a steering lever pivotally mounted thereon, and lifting means including concentrically arranged rotatable instrumentalities operatively connected to said elevating frame and to the lever and arranged in mutual torque compensating relation to prevent lateral deflection of the lever during load raising operation thereof due to a load on the elevating frame.

14. A side lift truck comprising in combination, a main frame, an elevating frame, a steering head swivelled in the main frame, a lifting member mounted for rotation about the steering axis of said steering head, an operative connection between said lifting member and said elevating frame whereby rotation of said member is adapted to lift said elevating frame, and means for rotating said lifting member comprising a steering handle pivoted on said steering head and having means engaging said lifting member in any steering position of the handle, said steering handle and engaging means being mounted for free steering movement relatively to said lifting member.

15. A side lift truck comprising in combination, a main frame, an elevating frame, a steering head swivelled in the main frame, a lifting member mounted coaxially with said steering head for rotation about the steering axis, an operative connection between said lifting member and said elevating frame whereby rotation of said member causes lifting movement of said elevating frame, and means for rotating said lifting member comprising a steering handle pivoted on said steering head and having means movable therewith, and engaging said lifting member in any steering position of the handle, said steering handle and engaging means being mounted for free steering movement relatively to said lifting member.

16. A side lift truck comprising in combination, a main frame, an elevating frame, a steering head swivelled in the main frame, a lifting member mounted coaxially with said steering head for rotation about the steering axis, an operative connection between said lifting member and said elevating frame whereby rotation of said member causes lifting movement of said elevating frame, and means for rotating said lifting member comprising a steering handle pivoted on said steering head, and means constantly in engagement with said lifting member and actuable by said steering handle in any steering position of the same, said steering handle and engaging means being mounted for free steering movement relatively to said lifting member.

17. A side lift truck comprising in combination, a main frame, an elevating frame, a steering head swivelled in the main frame, a lifting member mounted coaxially with said steering head for rotation about the steering axis, an operative connection between said lifting member and said elevating frame whereby rotation of said member causes lifting movement of said elevating frame, and means for rotating said lifting member comprising a steering handle pivoted on said steering head, and a geared connection between said steering handle and said lifting member operable by said handle in any steering position thereof.

18. A side lift truck comprising in combination, a main frame, an elevating frame, a steering head swivelled in said elevating frame, a steering handle pivoted to said steering head, means for lifting said elevating frame by vertical movement of the steering handle in any steering position of the same, said means comprising gearing actuable by the steering handle, and means mounted for rotation coaxially with said steering head, operatively associated with said gearing.

In testimony whereof, I have signed my name to this specification this 15th day of February, 1927.

WILLIAM STUEBING, Jr.